United States Patent [19] … [11] Patent Number: 5,035,308
Baba et al. … [45] Date of Patent: Jul. 30, 1991

[54] LOCK-UP CONTROL SYSTEM FOR AUTOMATIC TRANSMISSION

[75] Inventors: Fumiaki Baba, Higashihiroshima; Masanori Izumi, Hatsukaichi; Kenji Sawa; Susumu Kurumida, both of Hiroshima, all of Japan

[73] Assignee: Mazda Motor Corporation, Hiroshima, Japan

[21] Appl. No.: 250,603

[22] Filed: Sep. 29, 1988

[30] Foreign Application Priority Data

Oct. 1, 1987 [JP] Japan ................... 62-249336
Feb. 8, 1988 [JP] Japan ................... 63-27236

[51] Int. Cl.$^5$ ............... B60K 41/28; F16H 45/02
[52] U.S. Cl. .................. 192/0.052; 192/3.3; 192/3.58
[58] Field of Search ............ 192/3.58, 3.3, 0.052

[56] References Cited

U.S. PATENT DOCUMENTS

| | | | |
|---|---|---|---|
| 4,457,411 | 7/1984 | Hiramatsu | 192/3.58 X |
| 4,468,988 | 9/1984 | Hiramatsu | 74/868 |
| 4,509,124 | 4/1985 | Suzuki et al. | 364/424.1 |
| 4,565,267 | 1/1986 | Nishikawa et al. | 192/3.31 |
| 4,570,770 | 2/1986 | Nishikawa et al. | 192/0.052 |
| 4,577,737 | 3/1986 | Niikura et al. | 192/0.032 |
| 4,579,208 | 4/1986 | Nishikawa et al. | 192/0.076 |
| 4,580,671 | 4/1986 | Matsuoka et al. | 192/0.076 |
| 4,582,185 | 4/1986 | Grimes et al. | 192/0.076 |
| 4,618,041 | 10/1986 | Sotoyama et al. | 192/0.044 |
| 4,640,394 | 2/1987 | Higashi et al. | 192/3.29 |
| 4,669,441 | 6/1987 | Okimoto | 192/0.072 X |
| 4,687,083 | 8/1987 | Sotoyama et al. | 192/0.076 |
| 4,720,003 | 1/1988 | Murasugi | 192/0.076 |
| 4,724,939 | 2/1988 | Lockhart et al. | 192/3.3 |

FOREIGN PATENT DOCUMENTS

| | | | |
|---|---|---|---|
| 0042542 | 12/1981 | European Pat. Off. | |
| 0153798 | 9/1985 | European Pat. Off. | |
| 0256675 | 12/1985 | Japan | 192/3.3 |
| 0067461 | 3/1988 | Japan | 192/3.3 |
| 2163230 | 2/1986 | United Kingdom | |

Primary Examiner—Rodney H. Bonck
Attorney, Agent, or Firm—Jacobson, Cohn, Price, Holman & Stern Fleit

[57] ABSTRACT

A lock-up control system for an automatic transmission including a torque converter having an input member and an output member, a multiple stage gear transmission gear mechanism connected with the output member of the torque converter and having a plurality of gear stages and a lock-up clutch for connecting the input member and the output member bypassing the torque converter wherein an engaging force in the lock-up clutch is controllable so as to change the amount of torque transmitted through the lock-up clutch. The system comprises shift detecting device for detecting a shift operation in the transmission mechanism and control device for controlling the engaging force of the torque converter to be maintained at a predetermined value smaller than a fully engaged condition of the lock-up clutch and larger than an entirely released condition of the lock-up clutch when the shift operation is detected by the shift detecting device.

14 Claims, 8 Drawing Sheets

LOCK-UP CONTROL SYSTEM FOR AUTOMATIC TRANSMISSION

BACKGROUND OF THE INVENTION

1. Field of the Invention

The present invention relates to an automatic transmission, more particularly to a lock-up control system provided with a lock-up clutch in a torque converter.

2. Description of the Prior Art

In an automatic transmission having a torque converter and a transmission mechanism controlled in accordance with a shift pattern on a map to provide automatically one of a plurality of gear shift stages, it has been proposed to provide a lock-up clutch between an input member and output member of the torque converter for connecting the input member with the output member directly in accordance with an operating condition of a vehicle so as to improve an efficiency in transmitting an engine power. Assignee of the present application owns U.S. Pat. Nos. 4,580,671, 4,618,041, 4,669,441 and 4,687,083 which disclose conventional transmissions.

It should however be noted that the when a gear shift operation occurs in the transmission in accordance with the map in the case where the lock-up clutch is engaged, a torque shock between an engine side and a wheel side of the vehicle body caused by the shift operation is directly transmitted to the vehicle bypassing the torque converter resulting in a deterioration of a riding comfort. In view of this problem, there has been known a control for the automatic transmission in which the lock-up clutch is released to transmit the torque from the engine to the transmission through the torque converter until the shift operation is completed in the transmission.

However, even when the lock-up clutch is released to ease the torque shock caused by the automatic shift operation, the torque converter exerts an inherent torque amplification so that the torque shock cannot be removed effectively. In addition, when the lock-up clutch is engaged after the completion of the shift operation, an torque shock might be produced undesirably.

Under the circumstances, Japanese Patent Public Disclosure No. 57-33253 filed on Aug. 4, 1980 and laid open to the public in 1982, corresponding to U.S. Pat. No. 4,468,988 discloses a lock-up control system for an automatic transmission with a lock-up clutch in which under a specific driving condition of the vehicle, the lock-up clutch is maintained at a half-engaged condition allowing a certain slippage of the lock-up clutch in a manner that a rotation speed difference between the input shaft and the output shaft of the torque converter is controlled to a predetermined value by means of a feedback control. However, the slip control in the lock-up control system as disclosed in the Japanese Patent Public Disclosure No. 57-33253 is not so effective to ease the torque shock in a shift operation. This is because the slip control is not carried out when the shift operation occurs in a driving condition other than the specific driving condition.

SUMMARY OF THE INVENTION

It is therefore an object of the invention to provide a lock-up control system for an automatic transmission which can ease a torque shock caused by a shift operation for the transmission effectively.

It is another object of the invention to provide a lock-up control system of an automatic transmission which can provide a desirable slip control for a lock-up clutch.

It is further object of the invention to provide an improved lock-up control system for easing a torque shock produced in a vehicle through a shift operation in the transmission by controlling a slippage in a torque converter.

According to the present invention, in a lock-up control system for an automatic transmission including a torque converter having an input member and an output member, a multiple stage gear transmission gear mechanism connected with the output member of the torque converter and having a plurality of gear stages and a lock-up clutch for connecting the input member and the output member bypassing the torque converter wherein an engaging force in the lock-up clutch is controllable so as to change the amount of torque transmitted through the lock-up clutch, the improvement comprising shift detecting means for detecting a shift operation in the transmission mechanism and control means for controlling the engaging force of the torque converter to be maintained at a predetermined value smaller than a fully engaged condition of the lock-up clutch and larger than an entirely released condition of the lock-up clutch when the shift operation is detected by the shift detecting meas.

According to the present invention, the lock-up clutch is controlled in a manner that whenever a shift operation occurs in the transmission mechanism, the engaging force of the lock-up clutch is controlled at the predetermined value. Thus, the torque shock caused by the shift operation can be eased effectively.

Preferably the engaging force of the lock-up clutch is changed in accordance with a mode of the shift operation such as shift up, shift down, gear stages selected for the shift operation and the like.

The above and other objects and features of the present invention will be apparent from the following description by taking reference with accompanying drawings employed for a preferred embodiment of the present invention.

DESCRIPTION OF PREFERRED EMBODIMENTS

Figure 1:
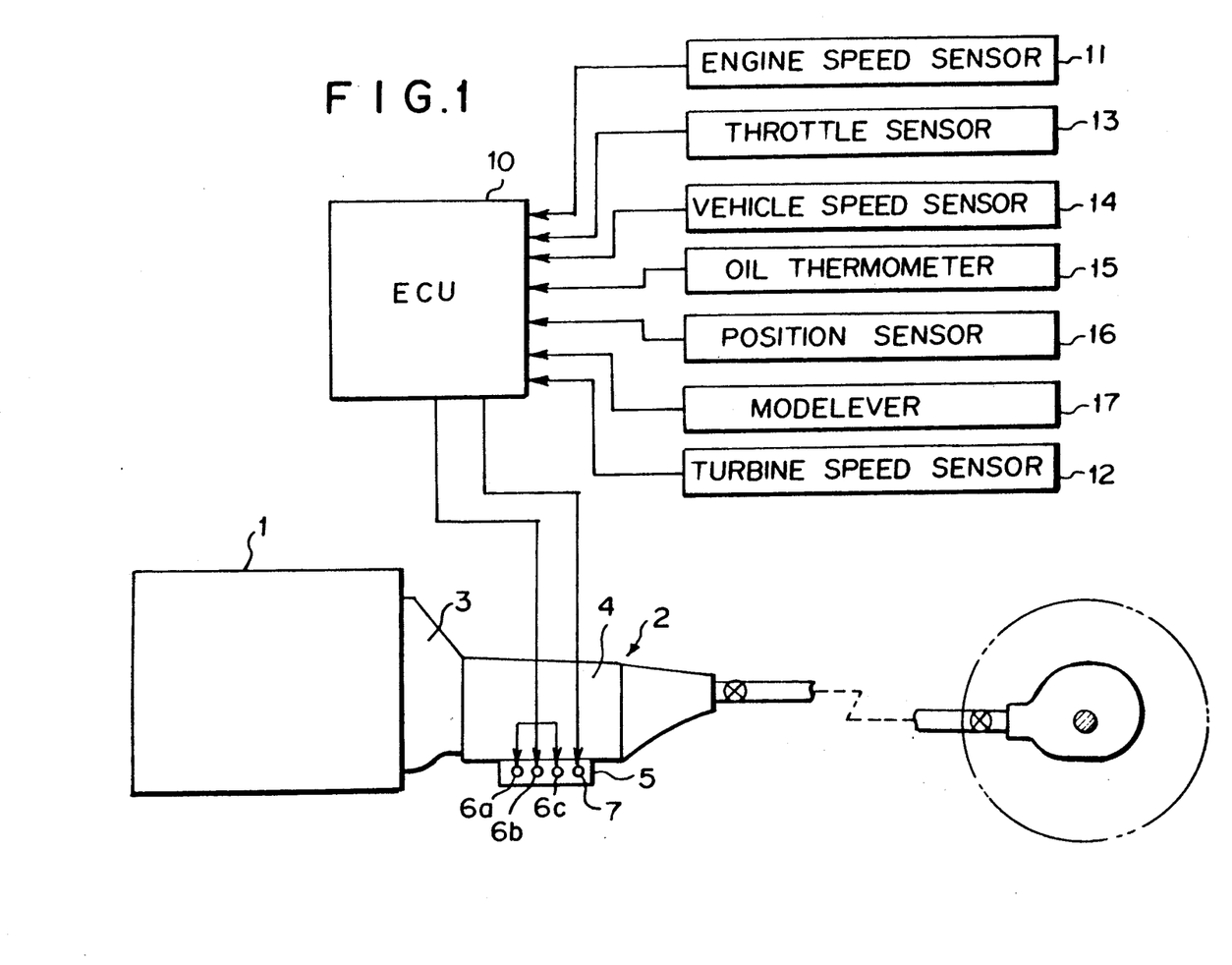
FIG. 1 is a schematic view of an automatic transmission in accordance with the present invention.

Referring to the drawings, specifically to FIG. 1, there is shown a schematic view of an automatic transmission in accordance with the present invention.

The transmission 2 connected with an engine 1 is provided with a torque converter 3, a transmission gear mechanism 4 having planetary gear mechanism for providing a plurality of shift stages and frictional elements such as clutches and brakes for switching a torque transmitting gear train of the planetary gear mechanism and a hydraulic control unit 5 for controlling the transmission mechanism 4 so as to provide a desirable shift gear stage. The hydraulic control unit 5 includes shift control solenoids 6a–6c and a lock-up control solenoid 7. The shift control solenoids 6a–6c are provided for controlling engagements and disengagements of the frictional elements of the transmission gear mechanism 4 through various control valves and shift valves so that either one of the plural shift gear stages in the transmission gear mechanism can be obtained through ON and OFF operations of the solenoids 6a–6c. There is provided an electronic control unit 10 (ECU) constituted by a micro-computer for controlling the solenoids 6a–6c and 7. The unit 10 receives signals from engine speed sensor 11 for detecting engine rotation speed of the engine 1, turbine speed sensor 12 for detecting turbine speed of the torque converter 3, throttle sensor 13 for detecting opening of a throttle valve, vehicle speed sensor 14 for detecting a vehicle speed, oil thermometer 15 for detecting a temperature of transmission oil or fluid, position sensor 16 for detecting a shift gear stage currently selected in the transmission gear mechanism 4 and mode lever 17 for detecting a driving mode selected.

Figure 2:
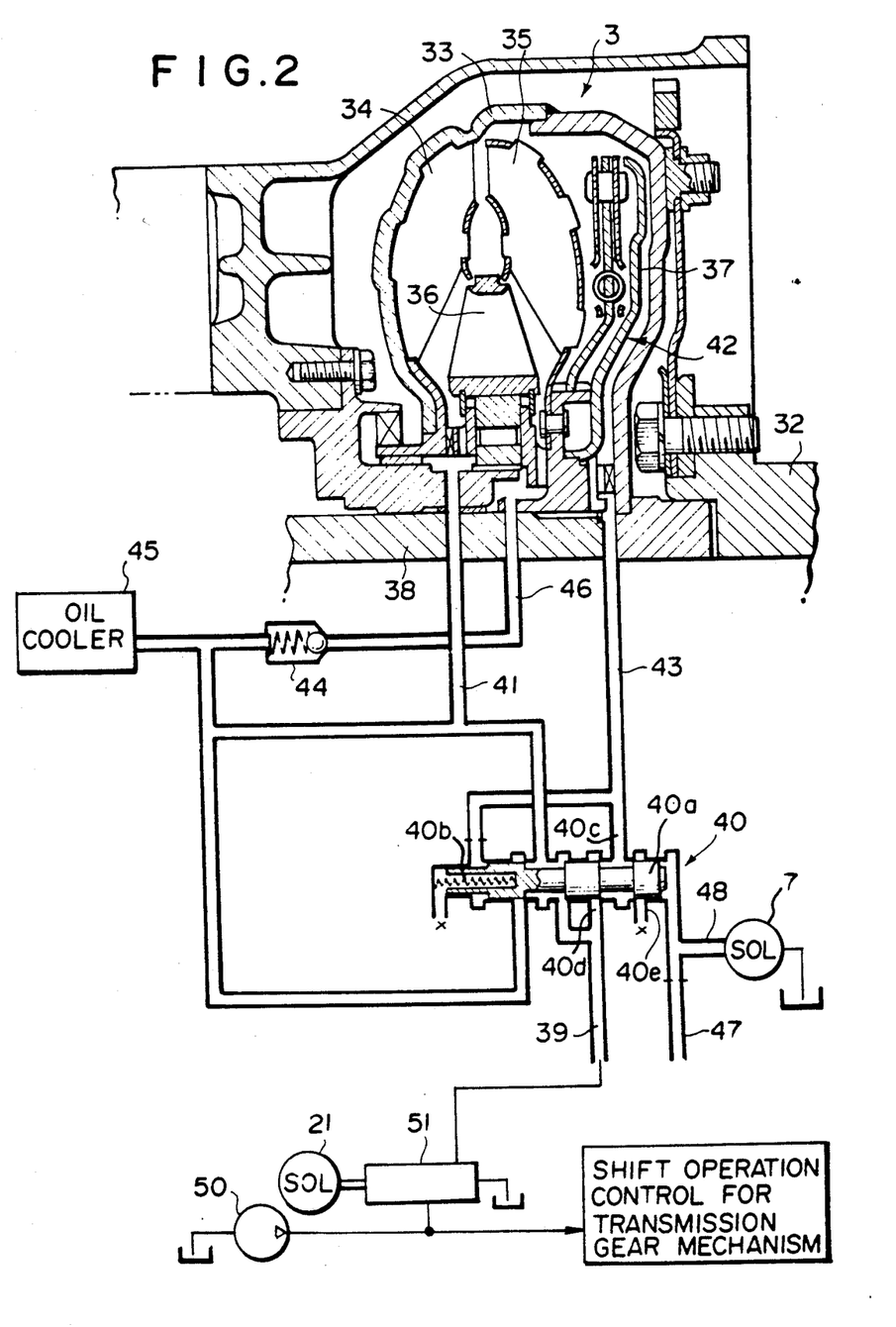
FIG. 2 is a sectional view showing a torque converter and a hydraulic circuit.

Now referring to FIG. 2, there is shown a hydraulic circuit in the hydraulic unit 5. The torque converter 3 is provided with a pump 34 as an input member fixed at one side of a case 33 which is connected with an output shaft 32 of the engine 1, a turbine 35 as an output member rotatably provided at the other side of the case 33 facing to the pump 34, a stator 36 provided between the pump 34 and the turbine 35 and a lock-up clutch 37 interposed between the turbine 35 and the case 33. The pump 34 rotates together with the output shaft 32 of the engine 1. The turbine 35 is driven by a driving force of the pump 34 through oil or fluid filled in the case 33. The stator 36 functions to amplify an engine torque transmitted from the pump when a speed ratio of the turbine 35 to the pump 34 is under a predetermined value. The lock-up clutch 37 is adapted to connect the turbine 35 with the case 33 so that the engine torque can be directly transmitted from the input member to output member of the torque converter 3 when the lock-up clutch 37 is fully engaged. The rotation of the turbine 35 is introduced into the transmission gear mechanism 4 through a turbine shaft 38.

The torque converter 3 is connected with an oil pump 50 through a main line 39 on which a pressure regulator 51 is disposed, a lock-up valve 40 and a converter line 41 so that a hydraulic pressure caused by a converter fluid is introduced into the torque converter 3. The hydraulic pressure acts on the lock-up clutch 37 for engaging. The clutch 37 and the case 33 defines an oil chamber 41 with which the lock-up valve 40 is communicated through a lock-up release line 43. When the hydraulic pressure is introduced into the chamber 41, the lock-up clutch 37 is disengaged from the case 33. The torque converter is connected with a converter out line for introducing the hydraulic fluid to an oil cooler through a check valve 44.

Figure 3:
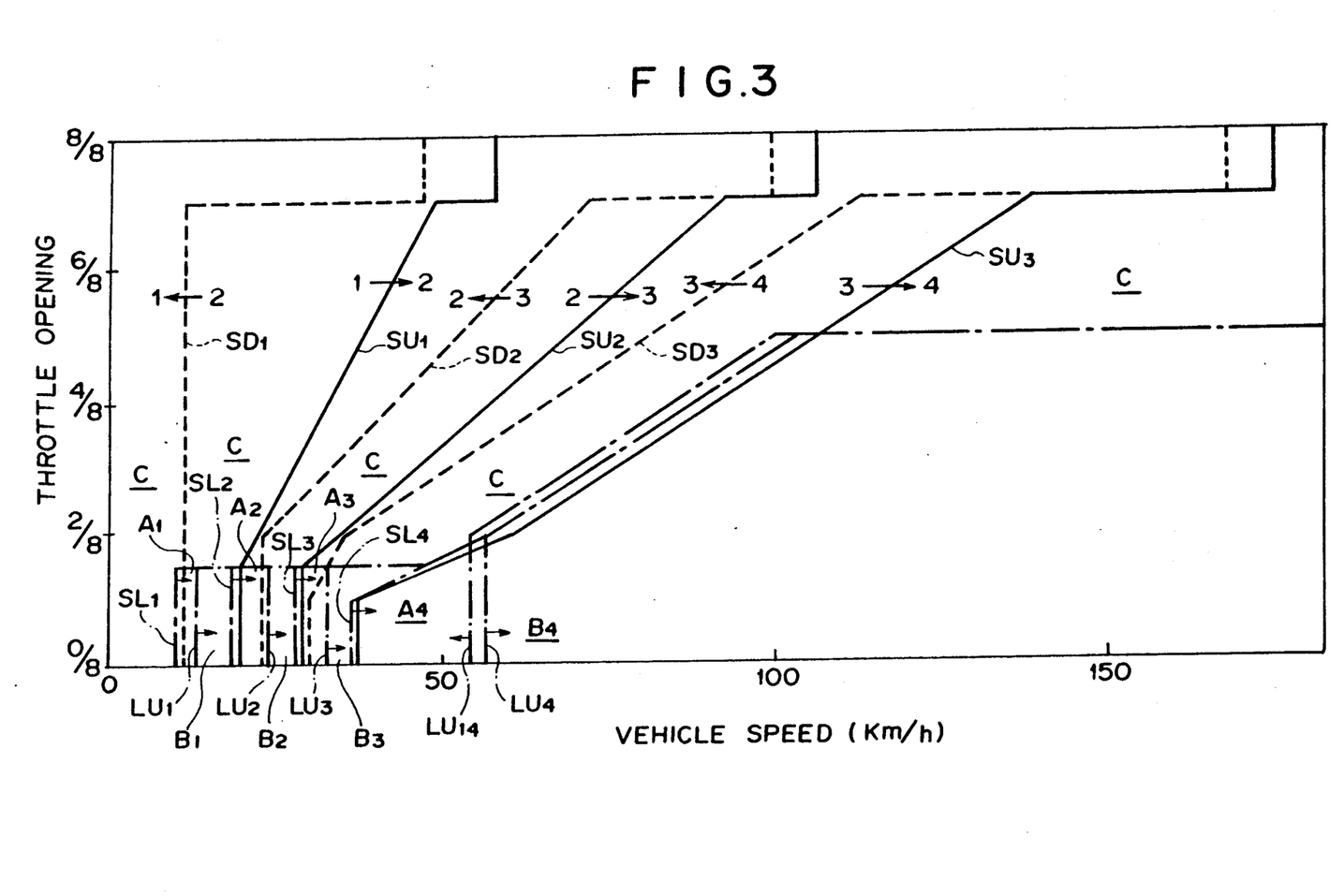
FIG. 3 is a graphical representation of a map showing a shift control property and lock-up control property.

The lock-up valve 40 is provided with a spool 40a and a spring for urging the spool in to the right in FIG. 2 and formed with a port 40c connected with the lock-up release line 43, a pressure regulating port 40d located at one side of the port 40c and connected with the main line 39 and a drain port 40e. To the right end of the valve 40 in FIG. 2 is connected a control line 47 for introducing a pilot hydraulic pressure to the spool 40a. There is provided the duty solenoid valve 7 on a drain line 48 which is separated from the control line 47. The solenoid valve 7 controls an opening of the drain line 48 continuously in accordance with a signal of a duty ratio. The pilot pressure is applied to the spool 40a of the lock-up valve 40 against a resilient force of the spring 40b. The spool 40a is also subjected to a hydraulic pressure from the lock-up release line 43 in the same direction as the resilient force of the spring 40b. Thus, the spool 40a moves in accordance with a sum of the resilient and hydraulic forced acting thereon so that the lock-up release line 43 is communicated with the drain port 40e or the main line 39 through the pressure regulating port 40d. When the duty ratio in the signal introduced in the solenoid valve 7 takes a maximum value, the quantity of the fluid for draining is maximized so that the pilot pressure or the pressure in the release line 43 is minimized to accomplish a full engagement of the lock-up clutch 37. This means all the engine torque is transmitted the transmission gear mechanism 4 through the lock-up clutch 37. On the contrary, the minimum value of the duty ratio causes an entire disengagement of the lock-up clutch 37 resulting in no torque transmitting through the clutch 37. This means all the engine torque is transmitted through the toque converter 3. When the duty ratio takes a value between the maximum and the minimum values, the lock-up clutch 37 produces a half-engagement condition in which a certain amount of slippage is allowed between the clutch 37 and the case so that a torque from the engine 1 32 is transmitted to the transmission gear mechanism 4 through both the toque converter 3 and the clutch 37. The control unit 10 is provided with a memory (not shown) in which a map of a shift pattern for shift operations of the transmission gear mechanism 4 and a lock-up control pattern for the lock-up control through the clutch 37 as shown FIG. 3 is stored. The shift up operations and plural shift down lines $SD_1$, $SD_2$ $SU_3$ for shift up operations and plural shift down lines $SD_1$, $SD_2$ and $SD_3$ for shift down operations corresponding to shift gear stages. The shift lines are set based on a vehicle speed and a throttle valve opening. The shift operation is carried out when the throttle opening and the vehicle speed change across one of the shift lines. In the lock-up control pattern, there is provided a slip control zone A in which the lock-up clutch 37 allows a certain slippage to control the amount of the torque transmitted therethrough, a lock-up zone B in which the lock-up clutch 37 is fully engaged and a converter zone C in which the lock-up clutch 37 is disengaged entirely. In the slip control zone, the solenoid valve 7 is controlled to provide a hydraulic pressure by which a speed difference between the input member and the output member of the torque converter 3 is maintained at a predetermined value. In the illustrated embodiment, the slip control zone A is provided in a specific area which is located at a relatively lower vehicle speed area of each shift gear stage in FIG. 3. The lock-up control zone B is provided in an area located at a relatively higher vehicle speed area adjacent the slip control zone A of each shift gear stage. The converter zone C is defined as an area other than the slip zone A and the lock-up zone B. There are also provided switching lines SL at which the slip control is turned on and lines LU at which the lock-up clutch 37 is fully engaged for each gear stage. A lock-up off line $LU_{14}$ is provided in the forth gear stage. Thus, when there occurs no shift operation in the transmission gear mechanism 4, the lock-up control is carried out in accordance with the zones A, B, C into which a driving condition in the light of the vehicle speed and the throttle opening falls.

Figure 4:
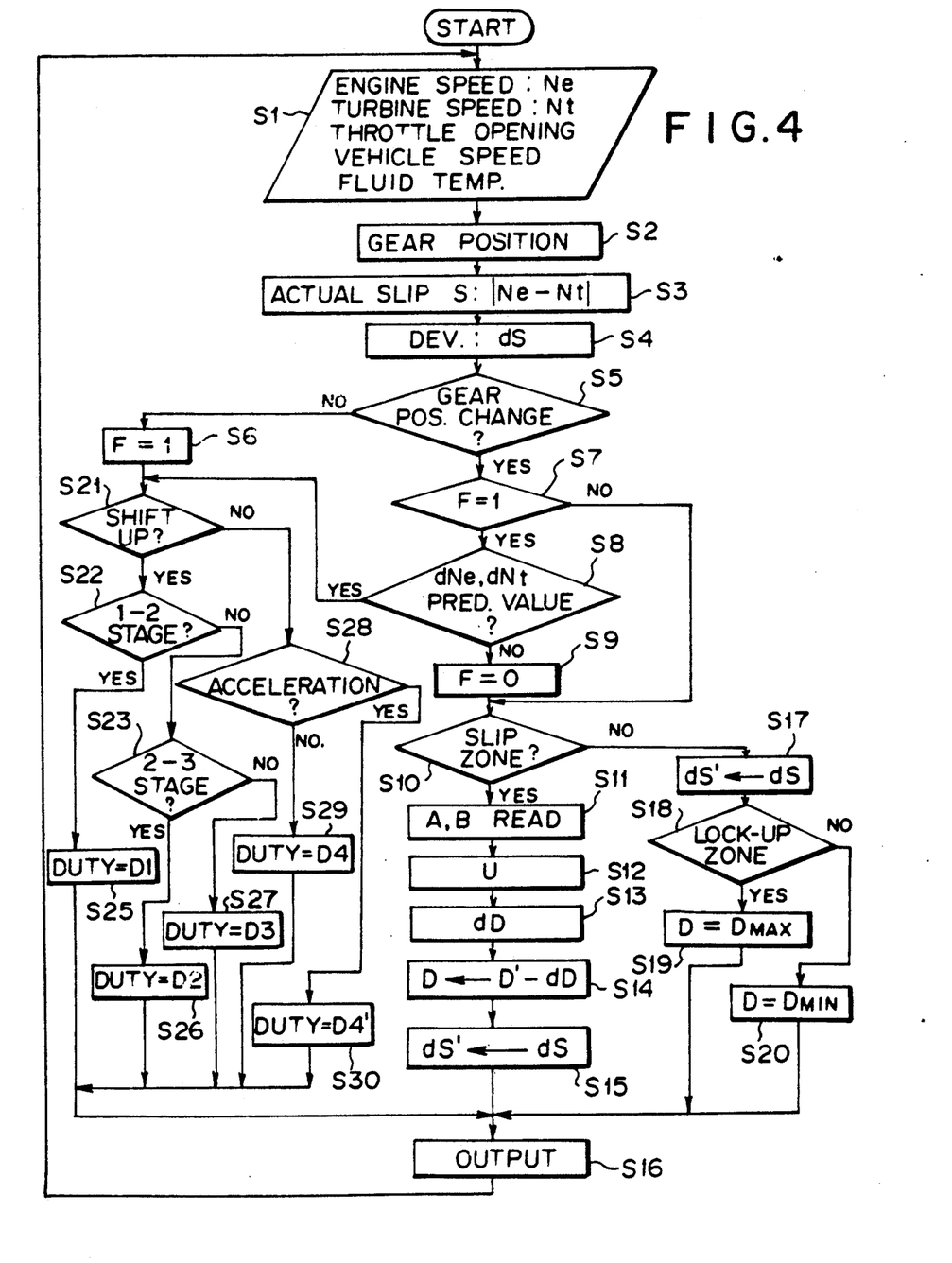
FIG. 4 is a flow chart of a lock-up control.

In operation, as shown in FIG. 4, the control unit 10 receives signals denoting an engine speed Ne, a turbine speed Nt, a throttle opening, vehicle speed and fluid temperature in Step S1. The control unit judges a shift gear stage of the transmission gear mechanism based on the above signals (S2). In step S3, an amount of actual slippage S of the lock-up clutch 37 is calculated based on a difference between the engine speed Ne and the turbine speed Nt. The control unit 10 calculate a deviation dS from a target slippage S0 of the lock-up clutch 37.

Figure 5:
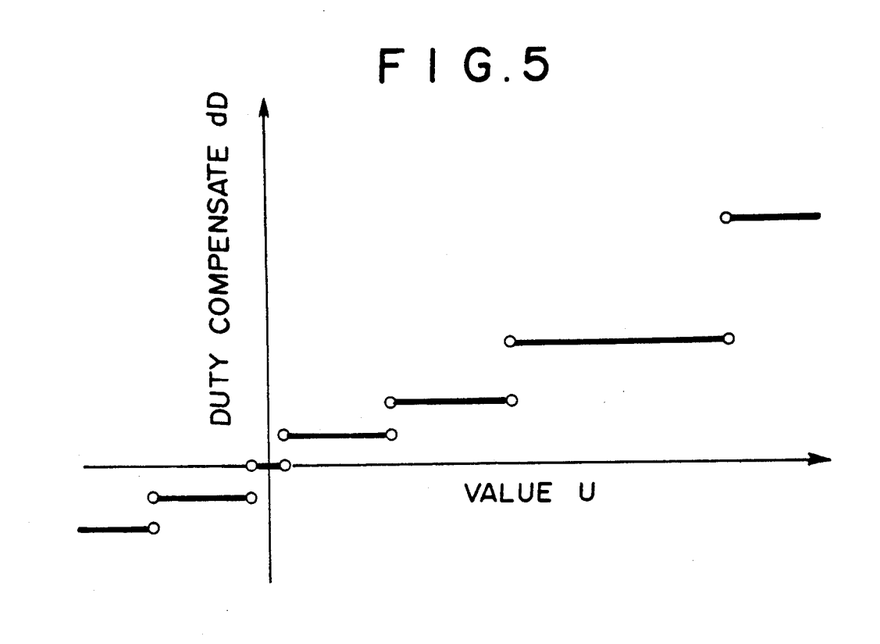
FIG. 5 is a graphical representation showing a relationship between a compensating value for the duty and parameter U.

In next step, the control unit 10 judges whether or not the transmission 2 is in a shift operation. In this judgement, the control unit 10 finds a start of the shift operation when the shift gear stage detected in step S2 is different from the result of the preceding cycle (S5) and sets a flag at F=1 (S6). If there is no change in shift gear stage in step S5, the control unit 10 judges the flag value (S7). If the flag is F=1, the control unit 10 judges whether or not a change in the turbine speed and the engine speed is greater than a predetermined value. If the judgment is yes, the control unit 10 finds that the vehicle is under a shift operation (S8). If no, the unit 10 judges the end of the shift operation and the flag is set at F=0 (S9). When the vehicle is not in a shift operation, in other words, when the judgment in step S7 is no or the judgment in S9 is no, the control unit 10 judges whether or not the driving condition of the vehicle with regard to the vehicle speed and the throttle opening is in the slip zones $A_1-A_4$ in step 10. If the vehicle driving condition is in the slip zones $A_1-A_4$, the control unit 10 controls the hydraulic pressure so as to change the engaging force of the lock-up clutch 37 in a manner that the deviation dS becomes small so that the actual slippage S approaches the target slippage S0 by means of a feedback control. For this purpose, the control unit 10 calculates a value U for compensating the duty signal D of the solenoid valve 7. In calculating the value U, the control unit 10 reads out values of control parameters A, B (S11). Then the control unit 10 calculates the value U by means of the following formula (S12);

$$U = A*dS + B*dS'$$

Wherein dS, dS' are deviations between the target and actual slippage in present cycle and the preceding cycle respectively. In next step (S13), the control unit 10 obtains a duty compensating value dD based on the value U in light of a map as shown in FIG. 5. The duty compensating value dD in this embodiment is increased stepwise in accordance with the value U. A duty D of present cycle can be obtained by adding the duty compensating value dD to a duty D' of the preceding cycle (S14).

The control unit 10 replace the preceding deviation of the slippage dS' of the clutch 37 by the present value dS (S15). Thereafter the control unit 10 provides the solenoid 7 with a control signal D obtained in step 14.

When the control unit 10 judges in step 10 that the vehicle driving condition is not in the slip zones, the control unit 10 replaces the preceding slip deviation dS' by the present slip deviation dS (S17) and judges whether or not the driving condition is in the lock-up zones B (S18). If the driving condition is in the lock-up zones B, the duty D is set at the maximum value Dmax so that the full engagement of the clutch 37 is accomplished (S19). On the contrary, if the judgment is No, the duty is set at the minimum value Dmin so that the clutch 37 is disengaged entirely (S20).

When a shift operation of the transmission is detected in step S5 and S7, the control unit 10 judges a mode of the shift operation and provides with a duty corresponding to the mode of the shift operation.

Figure 6:
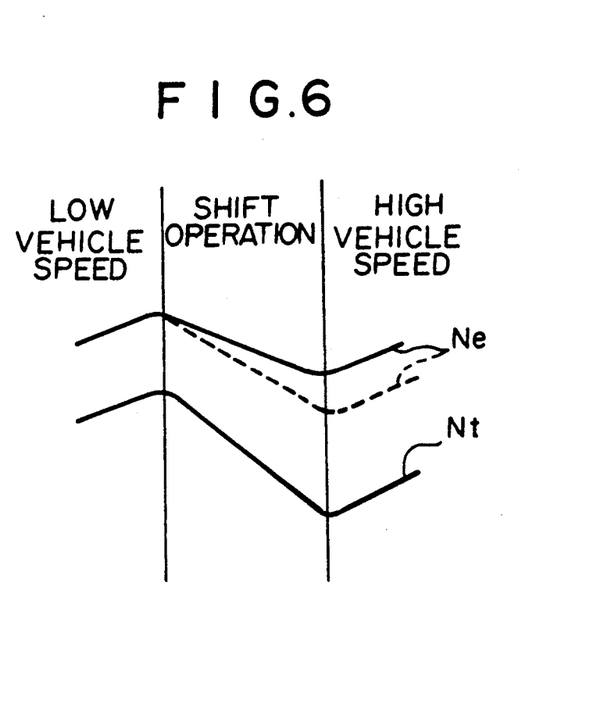
FIG. 6 is a graphical representation of a relationship between an engine speed and turbine speed in a shift up operation.

In shift up mode, as shown in FIG. 6, a change in the engine speed Ne become small because of a slippage of the torque converter 3 compared with a change in the turbine speed Nt so that the difference between the engine speed Ne and the turbine speed Nt is increased during the shift operation of the transmission. Thus, it is desirable in this mode that a relatively great engaging force of the clutch 37 is provided for restricting the slippage of the clutch 37 by means of a feedforward control as shown by a broken line in FIG. 6. As a result, an abrupt change in the torque transmitted through the converter 3 can be restricted so that a torque shock is reduced effectively without changing the engaging force of the clutch 37 during the shift operation.

Figure 7:
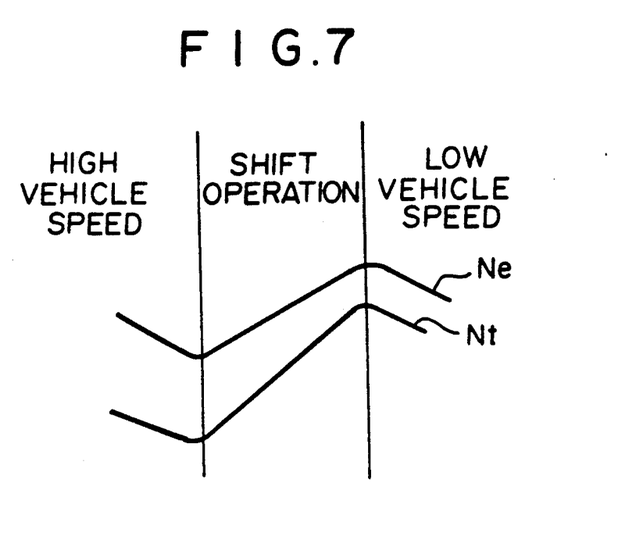
FIG. 7 is a graphical representation of a relationship between an engine speed and turbine speed in a shift down operation.

In shift down mode, as shown in FIG. 7, the change in the engine speed Ne is small comparing with the change in the turbine speed Nt. However the turbine speed is abruptly increased during the shift operation so that the difference between the engine speed Ne and the turbine speed Nt is reduced unlike the shift up mode. Thus, if the engaging force of the lock-up clutch 37 is increased, a lock-up condition may occur undesirably as a result of a small difference between the engine speed Ne and the turbine speed Nt. Therefore, in this mode, it is desirable to provide the clutch with a relatively small engagement force.

Figure 8:
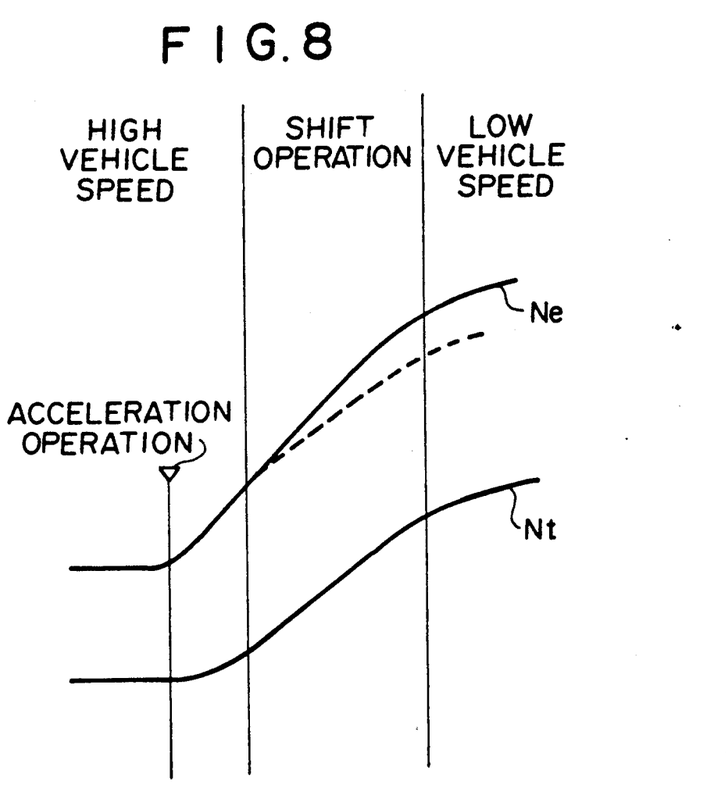
FIG. 8 is a graphical representation of a relationship between an engine speed and turbine speed in a shift down operation when an acceleration pedal is operated.

In the case where a shift down mode occurs when an accelerator pedal is operated greatly, as shown in FIG. 8, the engine speed Ne changes abruptly in comparison with the turbine speed change. Thus, it is desirable that the engaging force of the clutch 37 is increased so as to restrict an increase of the difference between the engine speed Ne and the turbine speed Nt to thereby provide an engine speed change property as shown by a broken line in FIG. 8. As a result, the torque shock caused by the shift operation can be eased.

Figure 9:
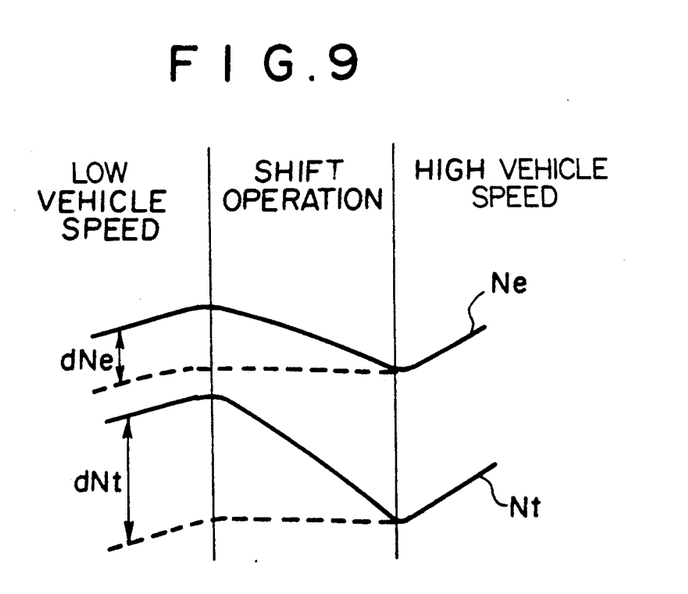
FIG. 9 is a graphical representation of a relationship between an engine speed and turbine speed corresponding to a kind of shift gear stages selected of a shift operation.
Figure 10:
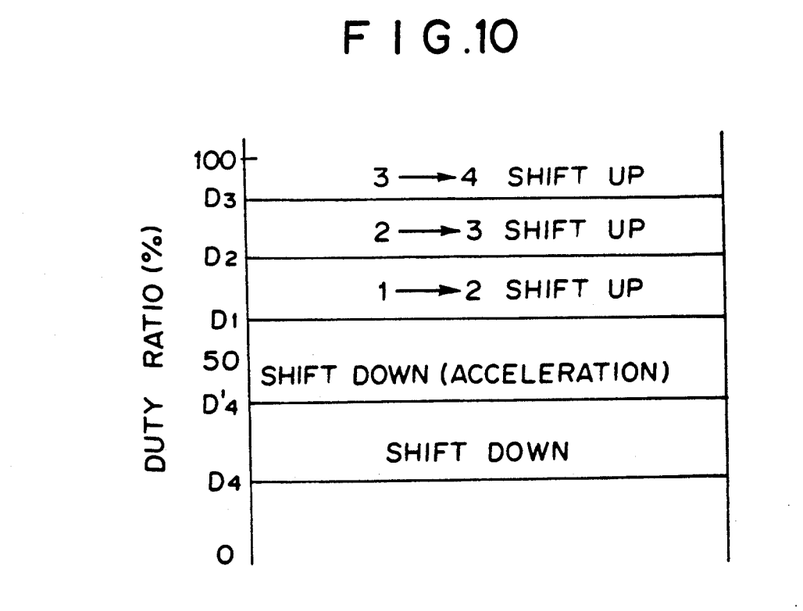
FIG. 10 is a view showing a relationship between a duty and a mode of the shift operation.

In addition, according to the illustrated embodiment, the duty for the solenoid valve 7 is changed in accordance with a kind of the gear stages between which a shift operation occurs, such as 1-2 gear stage, 2-3 gear stage, 3-4 gear stage and the like so as to produce an engaging force corresponding to the kind of the gear stages. This is because the change in the torque caused by the shift operation depends on a change in gear ratio which is produced during a shift operation since each of the gear stages has a different gear ratio from others. In the illustrated transmission 2, the 1, 2, 3 and 4-gear stages have gear ratios of 2.8, 1.54, 1.00 and 0.70 respectively. That is, the gear ratio is increased as the number of the gear stage is reduced. A difference in the gear ratio between two gear stages depends on the two gear stages selected so that a magnitude of the torque shock caused by a shift operation depends on the kind of the shift operation. As shown in FIG. 9, different kinds of the shift operations result in different engine and turbine speed change properties as shown by real and broken lines in Figure. Thus, it is desirable that the engaging force of the lock-up clutch 37 is controlled in accordance with the kind of the gear stages selected for a shift operation. Under the circumstances, in this embodiment, a value of the duty D is increased in the order of D1, D2 and D3 as the number of the two gear stages selected for a shift operation is increased as shown in FIG. 10.

In order to accomplish the above control, the control unit 10 at first judges whether the shift operation is a shift-up or down (S21). If it is a shift-up, the control unit 10 judges gear stages between which the shift operation is carried out (S22, S24) and provides a duty in accordance with the kind of the gear stages selected of a shift operation (S25, S26 and S27). Namely, duties D1, D2 and D3 of values shown in FIG. 9 are provided for shift operations of 1-2, 2-3 and 3-4 gear stages respectively.

If the judgment is No in the step 21, the control unit 10 judges whether or not the shift down operation is caused by a great acceleration operation for the acceleration petal such as a kick-down operation (S28). If it is true, the control unit 10 provides the duty with value D4'(S29), If not, with value D4 (S30) wherein D4' is greater than D4 for a greater engagement force of the clutch 37.

Figure 11:
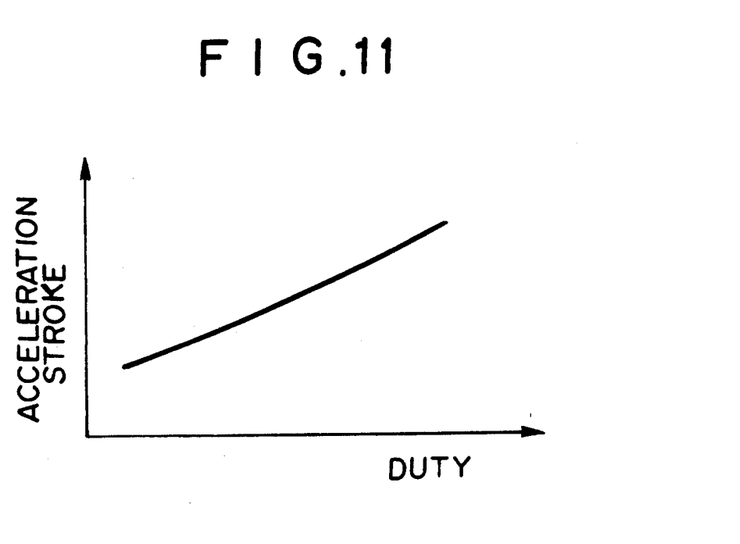
FIG. 11 is a graphical representation of a relationship between a duty for controlling a lock-up clutch and an acceleration stroke.

Alternatively, the duty can be set in accordance with a parameter for simply denoting an engine load such as the acceleration pedal operation and the throttle opening at the time of starting a shift operation as shown in FIG. 11 to control the engaging force of the clutch 37 wherein the value of the duty is increased as the engine load is increased.

Figure 12:
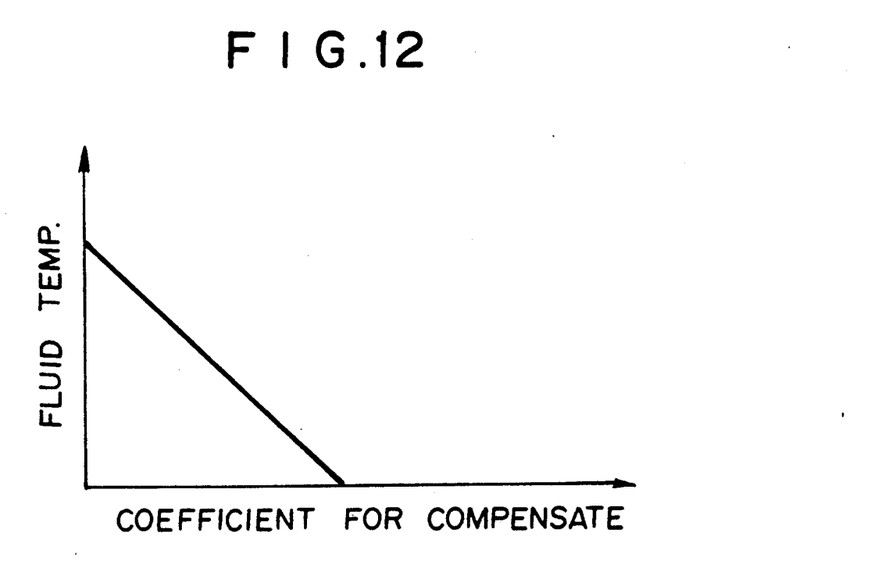
FIG. 12 is a graphical representation of a property of a compensation for the duty according to a hydraulic fluid temperature.

Further for better control, the duty is compensated in accordance with a temperature of the hydraulic fluid supplied for the transmission 4 wherein the compensating value is reduced as the hydraulic fluid temperature is increased in the embodiment as shown in FIG. 12.

It will be apparent from that many modifications and variations may be made based on the above descriptions by those skilled in the art without departing from the scope of the claims as attached.

We claim:

1. In a lock-up control system for an automatic transmission including a torque converter having an input member and an output member, a multiple stage gear transmission mechanism connected with the output member of the torque converter and having a plurality of gear stages, and a lock-up clutch for connecting the input member and the output member bypassing the torque converter wherein an engaging force in the lock-up clutch is controllable so as to change the amount of torque transmitted through the lock-up clutch, the improvement comprising:

shift detecting means for detecting a shift operation in the transmission mechanism, and control means for maintaining the engaging force at a predetermined value smaller than a fully engaged condition of the lock-up clutch and larger than an entirely released condition of the lock-up clutch throughout the shift operation.

2. A lock-up control system in accordance with claim 1 wherein the control means is provided with compensating means for compensating said predetermined value of the engaging force of the lock-up clutch in accordance with an engine load detected by engine load detecting means.

3. A lock-up control system in accordance with claim 2 wherein the compensating means increases said predetermined value of the engaging force as the engine load is increased.

4. A lock-up control system in accordance with claim 1 wherein the control means is provided with compensating means for compensating said predetermined value of the engaging force of the lock-up clutch in accordance with a mode of the shift operation detected by shift mode detecting means.

5. A lock-up control system in accordance with claim 4 wherein the shift mode detecting means detects whether a shift operation is a shift down operation or shift up operation.

6. A lock-up control system in accordance with claim 5 wherein the compensating means provides a greater value as said predetermined value of the engaging force in the shift up operation than the shift down operation.

7. A lock-up control system in accordance with claim 4 wherein the shift mode detecting means detects gear stages selected for a shift up operation.

8. A lock-up control system in accordance with claim 7 wherein the compensating means reduces said predetermined value of the engaging force as a difference in gear ratio between gear stages selected for the shift up operation is increased.

9. A lock-up control system in accordance with claim 4 wherein the shift mode detecting means detects a shift down operation during an acceleration operation in which the compensating increases the engaging force of the lock-up clutch.

10. A lock-up control system in accordance with claim 1 wherein the lock-up clutch is provided with a clutch plate operated in accordance with a hydraulic pressure introduced into an oil chamber for establishing a frictional engagement between the input and output members of the torque converter, the control means being provided with magnetic means for adjusting the hydraulic pressure to thereby keeping the engaging force of the lock-up clutch at a predetermined value, the magnetic means being provided with a duty solenoid actuated base on a variable duty signal in a manner of increasing the engaging force of the lock-up clutch as the duty signal is increased.

11. A lock-up control system in accordance with claim 10 wherein the control means increases the duty signal for the duty solenoid as engine load is increased.

12. A lock-up control system in accordance with claim 10 wherein the control means provides a greater value of the duty signal for the duty solenoid in a shift up operation than a shift down operation.

13. A lock-up control system in accordance with claim 10 wherein the control means reduces the duty signal for the duty solenoid as a difference in gear ratio between gear stages selected for a shift up operation is increased.

14. In a lock-up control system for an automatic transmission including a torque converter having an input member and an output member, a multiple stage gear transmission gear mechanism connected with the output member of the torque converter and having a plurality of gear stages and a lock-up clutch for connecting the input member and the output member by-passing the torque converter wherein an engaging force in the lock-up clutch is controllable so as to change the amount of torque transmitted through the lock-up clutch, the improvement comprising shift detecting means for detecting a shift operation in the transmission mechanism and control means for providing one of a lock-up condition in which the lock-up clutch is fully engaged, a released condition in which the lock-up clutch is entirely released and a slip condition in which a speed difference between the input and output members of the torque converter falls into a predetermined value resulting from a slippage in the lock-up clutch throughout the shift operation in at least two shift gear stages provided by the transmission gear mechanism.

* * * * *